United States Patent [19]

Nordale

[11] Patent Number: 4,981,544
[45] Date of Patent: Jan. 1, 1991

[54] STATIC DISSIPATIVE TAPE

[75] Inventor: John E. Nordale, Maplewood, Minn.

[73] Assignee: Minnesota Mining and Manufacturing Company, St. Paul, Minn.

[21] Appl. No.: 305,966

[22] Filed: Feb. 3, 1989

[51] Int. Cl.$^5$ .............................................. B32B 31/18
[52] U.S. Cl. ...................................... 156/252; 156/253; 428/40; 428/220; 428/244; 428/332; 428/921; 428/922; 428/293; 428/924; 428/925; 428/926; 361/212; 361/220; 361/221
[58] Field of Search ................ 156/252, 253; 361/212, 361/220, 221; 428/244, 921, 922, 40, 220, 332, 923, 924, 926, 925

[56] References Cited

U.S. PATENT DOCUMENTS

| | | | |
|---|---|---|---|
| 3,904,929 | 9/1975 | Kanaya et al. | 361/221 |
| 4,101,689 | 7/1978 | Wienand et al. | 428/922 |
| 4,208,696 | 6/1980 | Lindsay et al. | 361/212 |
| 4,219,602 | 8/1980 | Conklin | 428/921 |
| 4,301,040 | 11/1981 | Berbeco | 361/212 |
| 4,363,071 | 12/1982 | Rzepecki et al. | 361/220 |
| 4,414,260 | 11/1983 | Rzepecki et al. | 428/922 |
| 4,415,946 | 11/1983 | Pitts | 361/212 |
| 4,424,900 | 1/1984 | Petcavich | 428/922 |
| 4,784,908 | 11/1988 | Unger et al. | 428/922 |

*Primary Examiner*—Caleb Weston
*Attorney, Agent, or Firm*—Donald M. Sell; Walter N. Kirn; John C. Barnes

[57] ABSTRACT

A thin static dissipative tape construction for use as a rug or runner in static sensitive areas should have a thickness of less than 1.5 mm and preferably less than 1.02 mm and be adhesively coated for application direct to the floor. The tape comprises a static dissipative layer, a conductive layer laminated thereto and a continuous pressure sensitive adhesive coating. The static dissipative layer is textured. The tape may be perforated to apply wide webs to surfaces.

14 Claims, 1 Drawing Sheet

STATIC DISSIPATIVE TAPE

BACKGROUND OF THE INVENTION

1. Field of the Invention

This invention relates to a tape product used to drain static charge from personnel working in munitions and chemical plants and with sensitive electronic devices in circuit assembly areas, and in one aspect to a tape product which can be applied as a work surface covering, wall covering, rug or runner in areas where personnel are working with such devices to restrict damage due to static electricity.

2. Description of the Prior Art

Pads and mats for use in draining static charge from personnel are known and have been designed for use on work surfaces of various sorts. An example of such conductive mats is illustrated in U.S. Pat. No. 4,208,696 assigned to the assignee of this application. This patent affords an example of a web comprising a semiconductive polymeric surface layer, a conductive layer and a supporting substrate, for example, a resilient foam layer. This foam layer provides a cushioning when the web is used as a floor covering. Alternatively, a thin sheet of stiff plastic or fiberboard could be used in place of the foam, when the web is used under chairs and especially when used under chairs over carpeting. When the web was used as a floor mat, the thickness of the mat with the foam caused carts moving between work areas to bounce and the electronic parts contained therein to be jostled about. Further, soft mats would roll or wrinkle upon movement of a cart thereover, making the same not particularly desirable as floor coverings in the work areas.

The present invention provides a static dissipative covering for floors which does not have a height sufficient to cause a cart to be impeded in any way when rolling onto or off the covering. The tape of the present invention does not roll or wrinkle eliminating hazardous areas or areas where the material carts could be bounced during movement on, along, or off the same.

Another patent relating to static dissipative mats is U.S. Pat. No. 4,363,071 which discloses a multi-layer mat comprising an upper layer of low conductivity, in the order of $10^8$ ohms per square, bonded to a layer of greater conductivity in order of $10^2$ ohms per square, and a bottom layer of expanded polymeric material of relatively low conductivity, for example, an expanded version of the material of the upper layer. A further fabric base may be laminated to the bottom layer of the web as indicated in U.S. Pat. No. 4,414,260. The mat resulting had an overall thickness of 125 mils (3.175 mm) which has the same disadvantage of the web of the earlier patented construction, when used as a floor mat.

Further, in U.S. Pat. No. 4,219,602, and earlier issued U.S. Pat. No. 3,891,786, there is disclosed a sheeting material comprising an electrically conductive coating applied to a non-porous plastic substrate layer, the uncoated surface of which is then adhered to a second non-porous plastic layer by means of a plastisol adhesive. In one embodiment of U.S. Pat. No. 4,219,602 a reinforcing layer may be disposed within the plastisol adhesive layer. The fabrics produced by the invention of that patent were found suitable for use as mattress ticking, covers for wheeled stretcher pads, pillows, traction bags as well as other hospital applications. The thickness of the sheeting is said to comprise a ½ to 1 mil conductive layer and preferably a 2 to 4 mil (0.05 to 0.10 mm) non-conductive layer. This patent, U.S. Pat. No. 4,219,602 teaches a thin sheeting material but not a sheet material for controlled drainage of static charges. The earlier patent, U.S. Pat. No. 3,891,786, discloses a conductive sheeting comprising a polymeric film, which is perforated, laminated to a natural or synthetic rubber having up to 40% carbon black filler. The resultant product is conductive on the surface of the polymeric film.

U.S. Pat. No. 4,424,900 discloses a laminate material for use in the manufacture of packages and is approximately 2 mils (0.05 mm) thick comprising a polymeric substrate adhered to an anti-static polyolefin material, with a conductive layer of sputtered metal applied to either the substrate, having a volume resistivity of at least $10^{10}$ ohm-cm, or the anti-static layer, having a surface resistivity between $10^6$ to $10^{12}$ ohms per square. There is no teaching here of a tape material for use on a floor covering or that the adhesive layer should be covered by a removable liner to form a tape and surely such a product would be undesirable as a packaging material.

U.S. Pat. No. 3,904,929 discloses an electrodischarging sheet prepared by applying a carbon black-high molecular weight resin composition to a base material including woven, unwoven and knit clothes and paper having an affinity to the resin compositions The base material is porous and the material of this invention can be used for clothes, carpet or wall materials. A product of this invention was believed to have been sold as "NON-SPARK TAPE AND SHEET" and sold as a wrapping for piping, wherein at least one end of the tape product had an adhesive coating to adhere the end to the pipe.

The prior art references have thus provided teachings of various compositions of sheets, webs, mats, etc. serving to dissipate static charges which might build in the various areas. The need also for materials on the floor have been known, but the need for a material capable of discharging the static charges and yet not disrupt the normal flow of people and material carts has not been taught or recognized in the art. Therefore it is an object of the present invention to provide a tape in suitable widths to use as rugs or runners in work areas or as floor coverings in assembly areas to provide a static dissipative surface. The materials can also be used as wall and work surface coverings.

SUMMARY OF THE INVENTION

The present invention provides an improvement in static dissipative tapes and in tape like materials that can be used as rugs or runners, coverings for work surfaces and wall coverings in areas where protection against damage caused by static electricity is desired.

The tape of the present invention comprises a first layer of static dissipative material, a second layer in contact with the first of a conductive material, and an adhesive layer in contact with the conductive layer. The first layer preferably comprises a film of polymeric material having greater than $10^6$ ohm-cm volume resistivity. This layer can be smooth or textured and translucent or colored, to match a decor or for attracting attention. The conductive layer has a volume resistivity of less than $10^4$ ohm-cm The surface of the conductive layer is coated with a pressure sensitive adhesive affording means for attaching the tape to a surface. The adhesive is coated to a thickness of 1 to 5 mils (0.025 to 0.125 mm) and the adhesive is covered by a removable liner. The thickness of the tape including the thickness resulting from the embossing of an anti-slip textured surface to the static dissipative layer is between 0.015 inch (0.38 mm) and 0.060 inch (1.5 mm). The tape of the present invention is also perforated to afford ease of application of wide widths of tape.

BRIEF DESCRIPTION OF THE DRAWING

The present invention will be further described with reference to the accompanying drawing wherein.

DESCRIPTION OF THE PREFERRED EMBODIMENT

Figure 1:
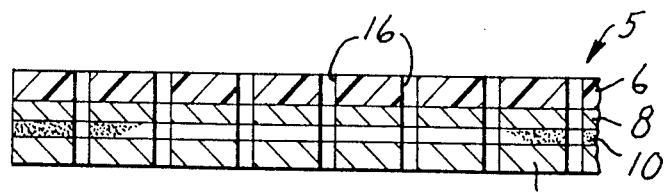
FIG. 1 is a fragmentary cross section of a completed tape structure.

The present invention relates to a tape construction for use in areas where it is desirable to restrict the rapid discharge of any static charge that may have built up on people or equipment accessing the area. The invention provides an improved tape construction that can be positioned on the floor, in a hallway, an aisle, assembly area or door way, on walls, work or storage areas or surfaces. The tape once in place will serve to dissipate the static charge built up on an individual coming in contact with the tape to restrict such charge from being suddenly drained to and damaging a static sensitive electronic device. The sudden spark discharge of static electricity is also uncomfortable to the individual and presents an explosive hazard in the presence of some chemicals, explosive dusts and munitions.

The tape of the present invention is generally designated by the reference numeral 5 and comprises a first layer of a static dissipative material 6 and a second layer 8, in contact with the first, of a conductive material. A third layer coated onto the surface of the conductive layer 8 opposite the dissipative layer is a layer of pressure sensitive adhesive material 10 coated uniformly over the surface of the conductive layer 8. A removable liner material 12 may be positioned in contact with the exposed surface of the adhesive coating 10

Figure 2:
FIG. 2 is a fragmentary detail cross section of a tape structure of the present invention to illustrate the surface of one of the layers.

The first layer 6 comprises a durable tough flexible thermoplastic polymeric material with a volume resistivity of between $10^6$ and $10^{12}$ ohm-cm The layer 6 is formed on one surface with a smooth easily cleaned surface, forming a better writing surface, or with a patterned, matte or embossed surface, see FIG. 2, providing a non-slip surface and improve the appearance of the tape. If opaque the tape may be colored to match a given decor or colored to accent or attract attention to an area. The first layer is formed as a film having an initial thickness of 0.005 to 0.015 inch (0.127 to 0.38 mm) and is subsequently coated by an extrusion process with material forming the conductive layer 8. The polymeric material preferably is a static dissipative polyvinyl chloride film which is opaque, translucent or transparent. A preferred example of a suitably tough, flexible, durable polymeric material is as follows:

| MATERIAL | PARTS | DESCRIPTION |
|---|---|---|
| Resin | 100 | PVC Resin VC-106-PM |
| Additives | 5 | Antimony Trioxide |

-continued

| MATERIAL | PARTS | DESCRIPTION |
|---|---|---|
|  | 3 | Stabilizer PG Dyphos |
|  | .5 | Hoechst OP Wax Powder |
|  | .4 | UV Absorber UV9 Cyasorb |
|  | 7.3 | Varstat-10 |
| Plasticizers | 45 | 9780 Plastolein |
|  | 5 | Santicizer 711 |
|  | 7 | Plas-Chek 775 |

If opaque, the tape is pigmented with an esthetic gray or brown color, or other color of choice. The surface texture, as indicated at 14 in FIG. 2 is formed by a texturing roll positioned in advance of the surface coater applying the conductive coating to the film.

The conductive layer 8 comprises a homogenous layer of polyvinyl chloride material having dispersed therein quantities of carbon or metal to provide a coating having a volume resistivity of less than $10^4$ ohm-cm. The conductive layer conforms to the adjacent surface of the first layer 6 and has an opposite smooth surface.

The conductive layer 8 is generally colored by virtue of the conductive particles dispersed therein. A preferred material is CV 79-8083-K compound from Teknor Apex Company of Pawtucket, R.I. Alternatively, it could be a thin layer of aluminum. If the tape is transparent the conductive layer may be a conductive nonwoven material formed of metallic fibers dispersed in a nonmetallic nonwoven matrix.

The adhesive layer 10 is applied to a smooth surface of the conductive layer 8. The adhesive layer is preferably uniform over the entire surface of the conductive layer and is preferably a pressure sensitive adhesive having a peel strength to steel of between about 9.8 ounces per inch to 34.6 ounces per inch (110 gram/cm to 390 gram/cm) preferably 15 ounces per inch (167 grams/cm) when coated uniformly onto the exposed surface of the conductive layer 8, as measured by ASTM standard D-3330. This pressure sensitive adhesive layer 10 permits ready removal and repositioning of the tape 5 from the receptor surface. The thickness of the adhesive layer 10 is about 0.002 inch (0.05 mm). An example of the adhesive is a compounded material similar in nature to Example 1 of U.S. Pat. No. 3,232,785 assigned to the assignee of this application. The preferred positionable adhesive and primer comprises the following:

| MATERIAL | PARTS | DESCRIPTION |
|---|---|---|
| Adhesive | 100 | SBR Sympol 1061 |
|  | 10 | Calcium Carbonate Atomite |
|  | 5 | Zinc Oxide |
|  | 59.9 | Unirez 628 Rosin Glyceryl Ester |
|  | 40 | Coumarone Indene Resin |
|  | 10 | Phenolic Resin |
|  | 2 | Antioxident Santovar A |
|  | 10 | White Oil |
|  | 498.8 | Heptane |
|  | 4.4 | Ethyl Alcohol |
| Primer | 247.6 | Water |
|  | 11.3 | Tergitor Nonionic TMN-6 |
|  | 2 | Baume Ammonia Water |
|  | 98.1 | Synthetic Rubber Latex |
|  | 84.7 | Styrene Butadiene Rubber |

The primer is applied to the conductive layer 8 by knife coating and the adhesive 10 is applied to the primed surface by knife coating. The liner material 12 is applied to the adhesive coating. The adhesive can alternatively be pattern coated to the smooth surface of the conductive layer 8. The laminated tape is perforated by a perforating roller, preferable placed against the static dissipative layer. The size of the perforations is not material, but they should penetrate all three layers, layers 6, 8 and 10, to allow air and/or moisture vapor to pass through the tape. The tape is adapted to be wound in rolls.

The tape 5 preferably has an overall thickness of between 0.015 inch (0.38 mm) to 0.025 inch (0.63 mm) but not greater then 0.040 inch (1.02 mm) to 0.060 inch (1.5 mm) when the static dissipative layer is embossed with an antislip textured surface thus including in the overall thickness the increased height resulting from the texturing operation on the first layer 6. This thickness when the tape is applied to the floor is such that it does not interfere with the free movement of the carts carrying sensitive electronic parts or other materials as the carts are rolled over the floor. The adhesive application of the tape to the floor restricts the tape from rolling or wrinkling which can also cause a jostling of parts in a cart or an individual to trip. Further, the adhesive layer protects the tape from movement or rolling at the corners. The tape 5, less the liner 12, is supple and has sufficient drape to be applied to a radius of 0.016 inch (0.40 mm).

The tape 5 can be applied in wide widths, i.e., 2 to 4 feet (0.6 to 1.3 meters) wide and of continuous length. When perforated by 0.02 inch (0.5 mm) perforations 16 on approximately one inch (2.54 cm) centers the tape 5 may to unwound from a roll and applied to a surface. Alternatively, it is applied by following the steps of wetting the surface where the tape is applied, removing the liner 12, placing the tape on the surface. A tool such as a squeegee-type tool or smoothing blade, such as a PA-1 applicator, available from Minnesota Mining and Manufacturing Company of St. Paul, Minn., is used to force or drive entrapped air and/or water from between the adhesive layer and the surface. Alternatively, the adhesive may be wet with the water and then the tape is placed over the desired surface. The perforations then permit the rapid drying of any residual water between the tape and surface.

Figure 3:
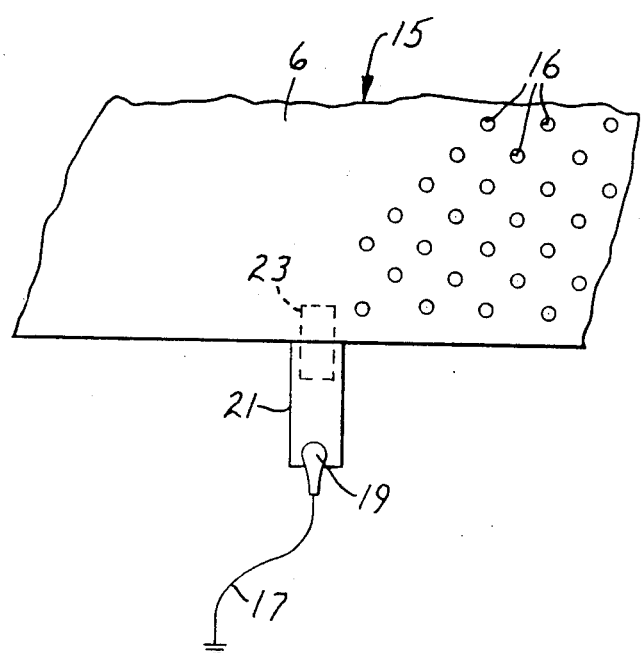
FIG. 3 is a schematic plan view of the tape of the present invention when applied.

Referring now to FIG. 3, there is illustrated a width of tape 5 positioned as a floor runner 15 and adhered to a floor by the adhesive coating. The tape 5 has the conductive layer, such as layer 8, joined by a ground line 17 to a suitable conductor at ground potential. The line 17 is connected by a terminal such as part number 52584 from AMP Incorporated, Morristown, Penna., to a thin strip 21 of the tape 5. The strip 21 is joined physically and electrically to the runner 15 by a strip of aluminum foil tape 23 which is adhered to the conductive layer of the runner 15 and strip 21. The tape 23 is tape No. 429 available from Minnesota Mining and Manufacturing Company, St. Paul, Minn.

Having thus described the present invention with respect to a description thereof, what is claimed is as follows.

What is claimed is:

1. A thin, tough, flexible, durable, static dissipative tape comprising a composite of:
   a first layer of static dissipative polymeric material having a volume resistivity of between $10^6$ to $10^{10}$ ohm cm;
   a layer of conductive material laminated to one surface of said first layer and having a volume resistivity of less than $10^4$ ohm-cm; and
   a layer of pressure sensitive adhesive applied to the surface of the conductive material opposite said first layer for applying said composite material to a surface,
   which composite has a total thickness less than 1.5 mm and sufficient drape to be applied to a radius of 0.40 mm.

2. A tape according to claim 1 wherein said layer of adhesive is continuous.

3. A tape according to claim 1 wherein said composite has said first layer textured on the surface opposite said one surface.

4. A tape according to claim 1 wherein said pressure sensitive adhesive layer and said conductive layer have a thickness of between about 0.15 mm and 0.63 mm.

5. A tape according to claim 1 wherein said pressure sensitive adhesive has a peel strength between about 110 gram/cm and 390 gram/cm when tested against steel by the standard test for peel strength of the ASTM.

6. A tape according to claim 1 wherein said tape is randomly perforated to permit air to pass through said composite.

7. A tape according to claim 3 wherein said composite is perforated to permit moisture vapor to pass through said composite.

8. A tape according to claim 1 wherein a removable liner is applied to said layer of adhesive.

9. A thin, tough, flexible, durable, static dissipative tape comprising:
   a first layer of static dissipative polyvinyl chloride polymeric material having a volume resistivity of between $10^6$ to $10^{10}$ ohm cm and a thickness of 0.127 to 0.38 mm;
   a layer of conductive material laminated to one surface of said first layer and having a volume resistivity of less than $10^4$ ohms-cm; and
   a continuous layer of plasticizer pressure sensitive adhesive applied to the surface of the conductive material opposite said first layer for releasably applying said tape to any floor surface, said conductive material and said static dissipative material having a thickness between 0.38 mm and 0.89 mm, which layers combined the have a total thickness of less than 1.5 mm and sufficient drape to be applied to a radius of 0.40 mm.

10. A tape according to claim 9 wherein said layers are perforated sufficiently to allow air and moisture vapor to pass through said perforations.

11. A method of applying a thin wide web of static dissipative tape to a surface, which tape comprises a first layer of static dissipative material having a volume resistivity of between $10^6$ to $10^{10}$ ohm cm, a layer of conductive material adhered to said first layer and a coating of pressure sensitive adhesive applied to said conductive material and covered by a liner comprising the steps of:
   perforating the wide web,
   placing the web over a said surface, and
   using a tool to smooth the surface of the tape on a said surface.

12. The method of claim 11 comprising the step of attaching a conductive line to said layer of conductive material of the web.

13. The method of claim 11 wherein the method includes the step of removing the liner.

14. The method of claim 11 including the step of applying water to a said surface and applying the adhesive side of said tape onto said wet surface.

* * * * *